United States Patent [19]

Maher et al.

[11] 4,272,946
[45] Jun. 16, 1981

[54] MOBILE HAMMER-MILL

[76] Inventors: Jack Maher, "Shangrilah", North Condobolin Rd., Forbes, New South Wales, 2871; Grosvenor F. Francis, Berowra, Leadville, via Dunedoo, New South Wales, 2744, both of Australia

[21] Appl. No.: 45,877

[22] Filed: Jun. 6, 1979

[30] Foreign Application Priority Data

Mar. 2, 1977 [AU] Australia ............................ FC9258
Mar. 2, 1978 [AU] Australia ............................ 33803/78

[51] Int. Cl.³ .......................................... A01D 55/26
[52] U.S. Cl. ..................................... 56/13.5; 56/16.6
[58] Field of Search .................... 56/13.5, 13.6, 13.9, 56/14.5, 14.6, 16.5, 16.6, 13.3

[56] References Cited

U.S. PATENT DOCUMENTS

| | | | |
|---|---|---|---|
| 3,162,003 | 12/1964 | Schapansky | 56/16.5 |
| 3,491,523 | 1/1970 | Bornzin | 56/13.9 |
| 3,585,730 | 6/1971 | Morse | 56/13.9 |
| 4,100,720 | 7/1978 | Carnewal et al. | 56/14.6 |
| 4,170,235 | 10/1979 | Ashton et al. | 56/14.6 |

*Primary Examiner*—Robert A. Hafer
*Attorney, Agent, or Firm*—Stevens, Davis, Miller & Mosher

[57] ABSTRACT

A mobile meal production means for a crop, such as lucerne, comprising a self propelled vehicle carrying a pick-up reel, a conveyor connecting the reel to a hammer-mill and a cyclone device connected to the hammer-mill. The output of the cyclone is fed, via a first vertically disposed auger, to the top of a holding hopper. A second vertically disposed auger is then connected between the bottom of the hopper and the top of a bagger.

3 Claims, 3 Drawing Figures

MOBILE HAMMER-MILL

This invention relates to agricultural implements, and more particularly to a mobile hammer-mill.

In the past it has been known to manufacuture such stock feed products as lucerne meal, also called "lucerne dust", by way of a slow and lengthy process typically involving a considerable number of steps including those of:

1. Moving a standing crop, such as lucerne for example, into a windrow;

2. Leaving the windrow to 'cure'—two or three days in hot weather for instance; the windrowed material being left until it has the dry appearance which results after its moisture content has been reduced to approximately 17% by weight at least and preferably lower;

3. Picking up the material of each windrow progressively using a baler having a forwardly-mounted hay pick-up in the form of a rake with spring-biased tines rotarily driven from the power take-off of a prime mover—such an implement feeding the pick-up material into the chamber of a baling mechanism where it is compressed into 70 lb. bales which are then tied with twine or wire before being allowed to fall out onto the ground at intervals;

4. Bringing a truck up to the lines of bales and picking them up either manually or by means of a mechanical loading device, whence they are conveyed to suitable storage such as a hay barn on feed mill, in the hope that they will be adequately protected from inclement weather, but wherein they are invariably inconveniently disposed for subsequent collection;

5. Removing the baling twine or wire from each bale and feeding the material into a hammer-mill; and 6. Passing the output of the hammer-mill into bags suitable for transport and use, said use probably taking place up to approximately one year later during an appropriate season.

It is an object of the present invention to eliminate, at least in part, the multiplicity of steps required in the above-described process and to provide means for manufacturing lucerne meal directly from the windrow.

In accordance with the present invention, therefore, in one of its aspects, a mobile meal-production means comprises, in combination, a self-propelled wheeled vehicle having a chassis which supports a hay pick-up, a conveyor, a hammer-mill, a first elevator and a bagger; said hay pick-up being positioned near ground level in communication with a forwardly-directed input region of said conveyor, the output region of which communicates with said hammer-mill, the output of the hammer-mill being adapted to feed the elevator at its lower end, the upper end of the elevator being in turn adapted to feed the said bagger; whereby the bagger deposits upon the ground or otherwise from the vehicle a continuous succession of bags containing meal as the vehicle progresses so as to traverse a windrow with the said hay pick-up.

It will thus be seen that meal, such as "lucerne dust" may be manufactured and bagged at what, in the prior art, was only the baling site, by a continuous process and therefore, in accordance with another aspect of the present invention a continuous process for manufacturing meal at the windrow site comprises the steps of: picking up hay from a windrow, conveying said picked-up hay to a hammer-milling station, feeding the resulting meal to a bagging station, bagging said meal at said bagging station and discharging bagged meal from said bagging station.

The mobile meal-production means according to the present invention permits the treatment of hay, such as lucerne hay, having a moisture content as previously described, to convert it into meal at the windrow site, bearing in mind that the operator of the equipment is able to check the material of the windrows by sight, 'feel' or both in order to ascertain whether curing has reached an appropriate stage. It will be appreciated that the dew condensing on a windrow overnight may render the material too moist, whereupon the operator would simply wait until the material became air-dried or sun-dried to an extent sufficient to commence production of meal; as is, of course, presently done. However, with the meal-production means and method according to the present invention, some restriction in available working hours due to awaiting curing of windrow material is more tolerable than hitherto since the need for such multiple handling above described is for the most part eliminated. In the production of meal such as "lucerne dust", best results are obtained if the windrowed hay is very dry and brittle, so that fracture on impact is assured.

In order that the reader may gain a better understanding of the invention, hereinafter is described a preferred embodiment thereof, by way of example only, with reference to the accompanying drawings in which.

Figure 1:
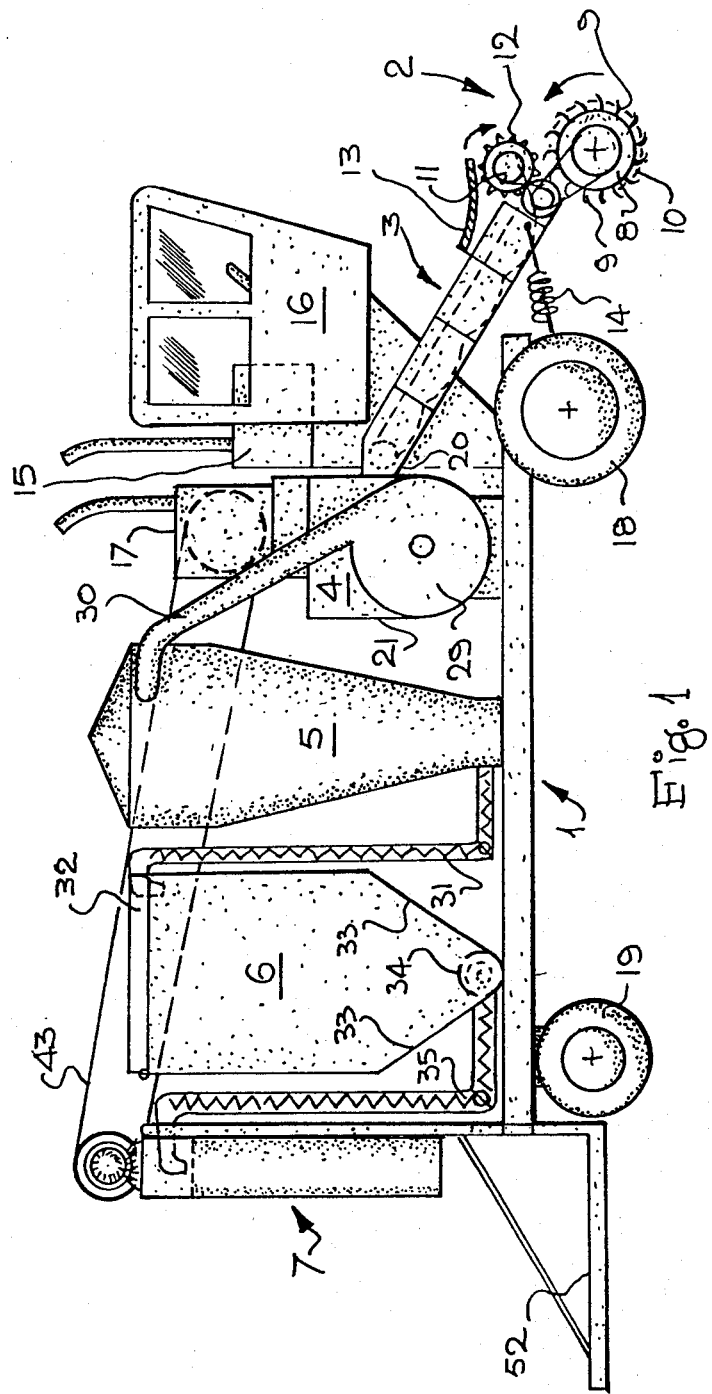
FIG. 1 is a side elevational view of the meal-production means of the present invention, in a simplified style.

FIG. 1 shows, in somewhat schematic and simplified form, the meal-production means of the present invention. The chassis of the self-propelled vehicle, generally indicated at 1, supports, in this most preferred embodiment, a hay pick-up 2, a conveyor 3, a hammer-mill 4, a cyclone 5, a holding hopper 6 and a bagger 7.

Hay pick-up 2 includes a reel or cage 8 having thereon a plurality of pick-up tines 9 which are spring-biased to pass through a slotted shield 10 which encloses reel 8. Tines 9 pick up hay from a windrow as it is traversed by the vehicle and deliver it to a feed roller 11 provided with a plurality of axially disposed serrated combs 12. Conveyor 3 is preferably of the order of 5 to 8 feet long and has an entrance chute 13 of about 20 inches in width while reel 8 may be from 3 to 4 feet wide. Guide plates are provided in known manner to channel hay picked up by tines 9 of reel 8 into the much narrower entrance chute 13 of conveyor 3. Conveyor 3 is connected to a hydraulic lifting arrangement 14 under the control of the driver and adapted to enable pick-up assembly 2 to be raised and lowered during progress of the vehicle which ideally is geared to move forward over the ground at approximately a walking pace. Conveyor 3 may be operated by 1, 2 or 3 endless chains but a single chain is preferred as, for narrow conveyors at least, it tends to give less trouble after becoming worn with use. Hay pick-up 2, conveyor 3 and feed roller 11 may well be driven through belts or chains (not shown in the interests of clarity) by a secondary mover 15 located alongside a driver's cab 16.

Behind cab 16 there is positioned a prime mover 17 which powers the hydraulic arrangement 14 and provides the means for propelling the vehicle itself. The chassis 1 of the vehicle may have a wheelbase of about 12 feet, the diameter of its front wheels 18 being about 3 to 3½ feet and that of its rear wheels 19 perhaps 2 to 2½ feet. Front wheels 18 or rear wheels 19 or, if desired, all the wheels may be driven by prime mover 18 and all said wheels shod with tires such as tractor tires. Preferably, rear wheel hydraulic steering, also powered by prime mover 17, is used to assist manoeuvrability. The top, output region 20 of conveyor 3 narrows into the form of a funnel to channel picked up hay directly into an input orifice of the hammer mill 4 and the lip of this funnel should be located as near as possible to the outer ends of the hammers of the mill when it is in operation.

Figure 2:
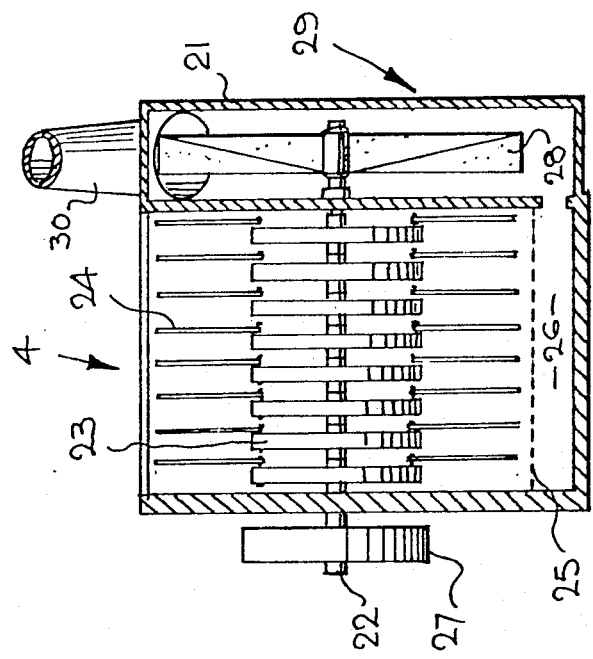
FIG. 2 is a schematic transverse cross-section of a suitable 48-hammer, 8-disc hammer-mill.

Turning now to FIG. 2, this shows, in schematic form, a transverse cross-section through a hammer-mill of a kind suitable for mobile meal-production means according to the present invention. Hammer-mill 4 includes a housing 21 through which passes a driven shaft 22. Within housing 21 are eight discs 23 mounted generally equidistantly upon shaft 22 and rigidly affixed thereto by means such as keys or splines to be easily removable for replacement of the hammers thereon.

About the circumference of each disc 23 are six equidistantly spaced pivot-holes having therethrough suitable pins upon which hammers 24 are freely pivoted. Thus hammer-mill 4 is provided with forty-eight hammers; that is, six hammers on each one of the eight discs.

Such hammer-mills are manufactured in various sizes, and particularly suited to the present invention is a mill having a housing 20 inches wide—i.e., having a driven shaft 20 inches long between bearings—and a diameter of 30 inches 'over hammers'. Each of the hammers is ideally 9 inches long by 1½ inches wide and manufactured from material such as ⅜ inch-thick hardened steel strip or plate. Beneath the shaft 22, discs 23 and hammers 24 a fine screen 25 spans housing 21. This screen 25 may be curved concentrically with the lower half-circumference of the discs 23. Below screen 25 the curver bottom plate of housing 21 forms a collecting trough 26.

Affixed to one end of shaft 22 is a driven pulley or sprocket 27 via which hammer-mill 4 is driven from secondary mover 15 by means of either a belt or chain drive. The other end of shaft 22 has affixed thereto an impeller or fan 28 of a rotary blower assembly generally indicated at 29. Dust or meal comminuted by hammers 24 falls through screen 25 to be impelled from the hammer-mill 4 under the action of rotary blower 29 to thereby pass along the elongated spout or tube 30 upwards for delivery into the top of a cyclone 5 from whence it is fed to a holding hopper 6 by way of an elevator 31 which may be an Archimedian screw auger assembly.

It will be realized from the abovegoing description that the mobile meal-production means of the present invention is able to be used without either blower 29 or cyclone 5; however, it has been found that the combination of these two integers considerably improves the working of the invention by giving what is virtually a 'fluidized flow' of meal from hammer-mill 4 to holding hopper 6, the purpose of which is to be explained hereinafter. Holding hopper 6 is provided with a cover 32, a V-shaped bottom portion 33 and a transversely-disposed auger 34 therein. The provision of a holding hopper such as 6 thus enables the implement to continue the meal-bagging operation even when it is not raking up hay; for instance, when it is being turned.

Meal leaves holding hopper 6 by way of an elevator 35 which, like elevator 31, may be an Archimedian screw auger assembly, and is finally discharged into the bagger 7.

Figure 3:
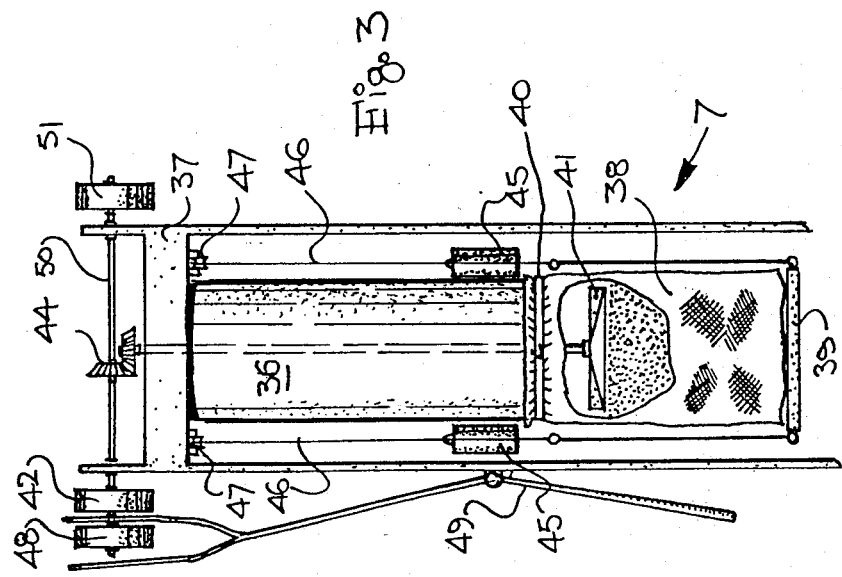
FIG. 3 is a rear view of a typical bagger assembly.

FIG. 3 illustrates a bagger suitable for use in the present invention. The bagger is mounted at the rear of the vehicle as shown in FIG. 1 and comprises an open-ended column or cylinder 36 depending from a framework 37. Cylinder 36 is of such a diameter as to fit into the mouth of a standard meal-bag 38 and is provided with a chair 39 upon which meal-bags are supported for filling. The mouths of the meal-bags are held tightly to cylinder 36 by means of a spring-band 40 or a similar device. Cylinder 36 has rotatably mounted inside it a bagging screw 41 which, when rotated, compresses the contents of the bag being filled. Bagging-screw 41 is powered by prime mover 17 via the pulley 42 and belt 43 (see FIG. 1) and the bevel-gear set 44.

The weight of chair 39 and the bag of meal supported thereon are balanced by means of counterweights 45 and the weight of meal packed into each bag 38 may be controlled by a suitable band-brake (not shown) which prevents freedom of movement of the cables 46 over their associated sheaves or pulleys or blocks 47.

When a meal-bag 38 has been filled and is ready to be removed from a cylinder 36, the filling operation has, naturally, to be temporarily discontinued by stopping bagging-screw 41 and elevator 35. This is achieved by the provision of an idler puller 48 onto which belt 43 can be moved by operation of the lever 49. This stops rotation of the bagging-screw 41 and also of elevator 35 which is also driven from the shaft 50 via pulley 51 or a corresponding sprocket.

The bagging and tying operation is carried out from the bagging platform 52 (see FIG. 1) which is cantilevered from the rear end of vehicle 1 and upon which an operator may stand during the operation.

Elevator 31 and auger 34 may be driven either from secondary mover 15 or prime mover 17 by belts or chains.

It will be realized from the foregoing that the present invention is not merely a harvesting implement and process but a manufacturing plant and process for stock feeds and while it has been described above with particular reference to a lucerne crop it nevertheless applies generally to fodder crops of legume and cereal nature.

The invention also eliminates much of the multiple handling formerly required and additionally the cost of the relatively expensive baling wire or twine or the equivalent thereof and, moreover, obviates the tedious and expensive task of carting bales to shed, barn or mill.

Furthermore, the invention overcomes the risk of the accidental milling of pieces of wire and the like, which could become mixed with the meal in a dangerous manner, having regard to the uses to which the said meal is usually put, namely as a foodstuff for such livestock as poultry and pigs.

The claims defining the invention are as follows:

1. A mobile meal-production means comprising, in combination, a self-propelled wheeled vehicle having a chassis which supports:
   a hay pick-up reel;
   a conveyor;
   a hammer-mill;
   a cyclone device;
   a first vertically-disposed auger;
   a holding hopper;
   a second vertically-disposed auger; and
   a single-column screw bagger;
   said hay pick-up reel being positioned adjacent ground level in communication with an input region of said conveyor, the output of which communicates with the input of said hammer-mill, the output of said hammer-mill feeding said cyclone device, the output of said hammer-mill being connected with said first vertically-disposed auger at its lower end, the upper end of said auger feeding said holding hopper, the output of said hopper being lower than its input and being connected to said second vertically-disposed auger at its lower end, and the upper end of said second auger, in turn, feeding said single-column screw bagger.

2. The mobile meal-production means as claimed in claim 1, wherein the said lower output region of said holding hopper feeds the lower end of said second vertically-disposed auger via a third auger transversely disposed within said holding hopper.

3. The mobile meal-production means as claimed in claim 1, wherein the output of said hammer-mill is impelled therefrom through a rotary blower to thereby feed said cyclone device.

* * * * *